(12) United States Patent
Choi et al.

(10) Patent No.: US 7,855,496 B2
(45) Date of Patent: Dec. 21, 2010

(54) BORON NITRIDE NANOTUBE PASTE COMPOSITION, ELECTRON EMISSION SOURCE INCLUDING THE SAME, ELECTRON EMISSION DEVICE INCLUDING THE ELECTRON EMISSION SOURCE, AND BACKLIGHT UNIT AND ELECTRON EMISSION DISPLAY DEVICE INCLUDING THE ELECTRON EMISSION DEVICE

(75) Inventors: Young-Chul Choi, Suwon-si (KR); Jong-Hwan Park, Suwon-si (KR); Kwang-Seok Jeong, Suwon-si (KR); Beom-Kwon Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 302 days.

(21) Appl. No.: 12/193,524

(22) Filed: Aug. 18, 2008

(65) Prior Publication Data

US 2009/0115314 A1    May 7, 2009

(30) Foreign Application Priority Data

Nov. 1, 2007    (KR) .................. 10-2007-0111048

(51) Int. Cl.
*H01J 9/02* (2006.01)
(52) U.S. Cl. ...................... 313/310; 252/500
(58) Field of Classification Search ........... 313/414, 313/441–460, 495–497, 293–304, 306, 309–310, 313/346, 351, 355
See application file for complete search history.

(56) References Cited

U.S. PATENT DOCUMENTS

| 6,057,637 | A | 5/2000 | Zettl et al. |
| 2001/0023021 | A1 | 9/2001 | Cohen et al. |
| 2007/0003472 | A1 | 1/2007 | Tolt |
| 2007/0096617 | A1 | 5/2007 | Hwang |

FOREIGN PATENT DOCUMENTS

EP    1 699 068 A2    9/2006

OTHER PUBLICATIONS

European Search Report dated Mar. 2, 2009 for corresponding Application No. EP 08 16 8023, noting references cited in this IDS.

*Primary Examiner*—Nimeshkumar D Patel
*Assistant Examiner*—Donald L Raleigh
(74) *Attorney, Agent, or Firm*—Christie, Parker & Hale, LLP

(57) ABSTRACT

Boron nitride nanotube paste compositions, electron emission sources including the same, electron emission devices including the same and backlight units and electron emission display devices including the same are provided. A boron nitride nanotube paste composition includes about 100 parts by weight boron nitride nanotubes, from about 500 to about 2000 parts by weight glass frit, from about 1000 to about 2000 parts by weight filler, from about 2000 to about 4000 parts by weight organic solvent, and from about 4000 to about 6000 parts by weight polymer binder. Electron emission devices including the boron nitride nanotube electron emission sources have longer lifespan and improved uniformity among pixels.

18 Claims, 4 Drawing Sheets

BORON NITRIDE NANOTUBE PASTE COMPOSITION, ELECTRON EMISSION SOURCE INCLUDING THE SAME, ELECTRON EMISSION DEVICE INCLUDING THE ELECTRON EMISSION SOURCE, AND BACKLIGHT UNIT AND ELECTRON EMISSION DISPLAY DEVICE INCLUDING THE ELECTRON EMISSION DEVICE

CROSS-REFERENCE TO RELATED PATENT APPLICATION

This application claims priority to and the benefit of Korean Patent Application No. 10-2007-0111048, filed on Nov. 1, 2007 in the Korean Intellectual Property Office, the entire content of which is incorporated herein by reference.

BACKGROUND OF THE INVENTION

1. Field of the Invention

The present invention relates to boron nitride nanotube paste compositions, electron emission sources including the same, electron emission devices including the electron emission sources, and backlight units and electron emission display devices including the electron emission devices.

2. Description of the Related Art

Generally, electron emission devices are classified into two types: 1) a hot cathode type in which a hot cathode is used as the electron emission source, and 2) a cold cathode type in which a cold cathode is used as the electron emission source. Examples of cold cathode electron emission devices include Field Emitter Array (FEA) devices, Surface Conduction Emitter (SCE) devices, Metal Insulator Metal (MIM) devices and Metal Insulator Semiconductor (MIS) devices, and Ballistic electron Surface Emitting (BSE) devices.

Among these electron emission devices, carbon-type materials are widely used as a constituent of the electron emission source. For example, carbon nanotubes are widely used, which are superior in conductivity, electro-focusing effects, and field emission properties, and have low work functions.

However, since carbon nanotubes reach very high temperatures when emitting electrons, combustion can occur in CO or $CO_2$ even when there is a very small amount of oxygen, thereby burning the ends of the carbon nanotubes. Moreover, properties, such as band gap, change depending on the rolled direction of the carbon nanotube, and since the rolling direction cannot be controlled, it is not possible to control the properties of the conductor or semiconductor. Hence, carbon nanotubes do not have good uniformity or lifespan.

SUMMARY OF THE INVENTION

In one embodiment of the present invention, a boron nitride nanotube paste composition has improved stability, lifespan, and uniformity among pixels.

According to another embodiment of the present invention, a boron nitride nanotube electron emission source is formed using the boron nitride nanotube paste composition.

In yet another embodiment of the present invention, an electron emission device has the boron nitride nanotube electron emission source.

According to still another embodiment of the present invention, a backlight device includes the electron emission device.

In still yet another embodiment of the present invention, an electron emission display device includes the electron emission device.

According to one embodiment of the present invention, a boron nitride nanotube paste composition comprises about 100 parts by weight of boron nitride nanotubes, from about 500 to about 2000 parts by weight of glass frit, from about 1000 to about 2000 parts by weight of filler, from about 2000 to about 4000 parts by weight of an organic solvent, and from about 4000 to about 6000 parts by weight of a polymer binder.

In one embodiment, the boron nitride nanotubes can have a B-to-N ratio of about 1:0.5-1.5.

The boron nitride nanotube paste composition may also include commonly used viscosity enhancers, leveling enhancers, dispersants, and antifoaming agents whenever necessary.

According to another embodiment of the present invention, a boron nitride nanotube electron emission source is formed by printing and calcining the boron nitride nanotube paste composition according to the invention.

According to yet another embodiment of the present invention, an electron emission device comprises a substrate, a cathode on the substrate, a gate electrode electrically insulated from the cathode, an insulation layer insulating the cathode and the gate electrode, an electron emission source hole exposing a part of the cathode, an electrode emission source in the electron emission source hole and electrically connected electrically to the cathode, and a phosphor layer facing the electron emission source. The electron emission source includes about 100 parts by weight of boron nitride nanotubes, from about 500 to about 2000 parts by weight of glass frit, from about 1000 to about 2000 parts by weight of filler, and from about 4000 to about 6000 parts by weight of a polymer binder.

The electron emission source can have a specific resistance ranging from about $10^{-3}$ Ω·cm to about $10^{-8}$ Ω·cm at 25° C.

The electron emission device can include an additional gate electrode on the upper surface of the gate insulation layer to form a three-electrode structure.

According to another embodiment of the present invention, an electron-emitting backlight device includes the electron emission device.

According to still another embodiment of the present invention, an electron emission display device includes the electron emission device.

In one embodiment of the present invention, the electron emission device includes an emitter including boron nitride nanotubes instead of carbon nanotubes. The electron emission device thus has a longer lifespan since deterioration (caused by oxidation, which occurs when carbon nanotubes are used) does not occur. Moreover, compared to conventional carbon nanotube emitters (in which blinking occurs when operating an electron emission device due to the inability of the carbon nanotubes to maintain constant electric properties), the electron emission devices according to the present invention have increased uniformity among pixels due to the use of boron nitride nanotubes with constant electric properties.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

Figure 1A:
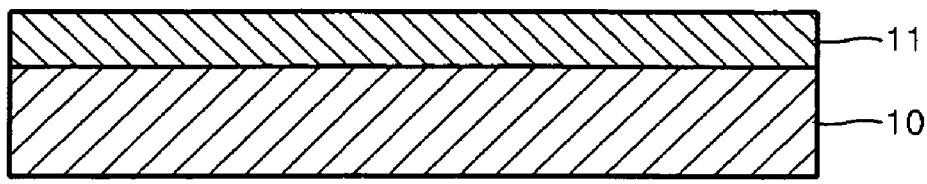
FIGS. 1A to 1E are cross sectional views an electron emission device taken at varying steps in a method of manufacturing the electron emission device according to an embodiment of the present invention.

According to one embodiment of the present invention, a boron nitride nanotube paste composition includes about 100 parts by weight of boron nitride nanotubes, from about 500 to about 2000 parts by weight of glass frit, from about 1000 to about 2000 parts by weight of filler, from about 2000 to about 4000 parts by weight of an organic solvent, and from about 4000 to about 6000 parts by weight of a polymer binder.

Boron nitride nanotubes have the same structure as carbon nanotubes, but because they do not react with oxygen, they have higher stability and superior heat-resistance at high temperatures.

The boron nitride nanotubes used in embodiments of the present invention have the same structure as carbon nanotubes, but carbons are randomly replaced with boron or nitrogen. This type of boron nitride nanotubes may be composed solely of boron and nitrogen, or may additionally include carbon.

In one embodiment, the boron nitride nanotubes may have a content ratio of B and N ranging from about 1:0.5 to about 1:1.5. When the content of N relative to B is lower than about 1:0.5, that is, when the content of N is relatively small with respect to B, structural instability arises. When the N content is higher than 1:1.5 relative to B, that is, when the content of N is relatively large, low electron emission current density occurs.

Moreover, when the boron nitride nanotubes are composed of B, N, and C, the boron nitride nanotubes may include about 100 parts by weight of boron to from about 0.01 to about 100 parts by weight of carbon. Oxidation during electron emission occurs when the carbon content is higher than about 100 parts by weight per about 100 parts by weight of boron.

The boron nitride nanotubes can be synthesized using the same manufacturing methods as for carbon nanotubes. For example, arc discharge can be used for the synthesis. In such a method, a hole is made in a graphite rod and filled with boron nitride powder, and arc discharge is performed using the hole filled with the boron nitride powder as an anode, thereby synthesizing nanotubes including B, N, and C. If a tungsten rod is used instead of a graphite rod, boron nitride nanotubes without C can be synthesized.

Chemical vapor deposition can also be used to synthesize boron nitride nanotubes. In this method, a catalytic metal such as Ni, Co, Fe, or alloy thereof is mounted in a reactor and heated at a temperature ranging from about 700 to about 900° C. under a gas atmosphere including a B-containing (e.g. $BCl_3$) and a N-containing gas (e.g. $NH_3$), thereby synthesizing boron nitride nanotubes.

According to one embodiment, a boron nitride nanotube paste composition includes glass frit in an amount ranging from about 500 to about 2000 parts by weight. If the glass frit content is lower than about 500 parts by weight per 100 parts by weight of the boron nitride nanotubes, adhesiveness of the paste can be poor and emission current density can be low. If the glass frit content is greater than about 2000 parts by weight, viscosity becomes too high, thereby causing printing difficulties and low emission current density.

The filler, such as Ag, $Al_2O_3$, $In_2O_3$, and $SnO_2$, is used to improve the alignment properties of the boron nitride nanotubes. In one embodiment, the filler is present in an amount ranging from about 1000 to about 2000 parts by weight. If the filler content is lower than about 1000 parts by weight per 100 parts by weight of the boron nitride nanotubes, the boron nitride nanotubes are not arranged well during electron emission source formation, leading to poor electron emission properties. If the filler content exceeds about 2000 parts by weight, the viscosity of the composition becomes exceedingly high, thereby leading to printing difficulties.

The organic solvent is used to control the viscosity of the composition, and terpineol, butyl carbitol acetate, toluene, or texanol may be used as the organic solvent. Also, the organic solvent may be present in an amount ranging from about 2000 to about 4000 parts by weight per 100 parts by weight of the boron nitride nanotubes. If the content of the organic solvent is lower than about 2000 parts by weight, the viscosity of the composition becomes too high to print. If the content of the organic solvent is greater than about 4000 parts by weight, the viscosity of the composition becomes too low to achieve appropriate printing thickness.

The polymer binder, such as methyl methacrylate-methyl acrylic acid (MMA-MAA) and methyl methacrylate-acrylic acid-polystyrene (MMA-AA-PS), is used to increase the cohesion of each component within the paste. The polymer binder may be present in an amount ranging from about 4000 to about 6000 parts by weight per 100 parts by weight of the boron nitride nanotubes. If the polymer binder content is less than about 4000 parts by weight, weak cohesion occurs, and when the binder polymer content is higher than 6000 parts by weight, low printability and low electron emission properties occur.

Moreover, the boron nitride nanotube paste composition according to embodiments of the present invention can also include viscosity enhancers, leveling enhancers, dispersants, and antifoaming agents. The contents of the additives (such as viscosity enhancers, leveling enhancers, dispersants, and antifoaming agents) range from about 0 wt % to less than about 10 wt %. As the dispersant, commonly available surfactants and antifoaming agents may be used.

A method of manufacturing the boron nitride nanotube paste composition according to one embodiment of the present invention will now be described. The boron nitride nanotube paste composition according to embodiments of the present invention is used to form an electron emission source, and may be made by first mixing the boron nitride nanotube powder, the glass frit, and the filler powder. When mixing the boron nitride nanotube powder and the glass frit, a ball mill can be used to rotate the composition at a speed ranging from about 5 to about 100 rpm for from about 1 to about 24 hours.

The polymer binder is separately prepared and diluted in an organic solvent. As the organic solvent, terpineol, butyl carbitol acetate (BCA), toluene, or texanol can be used. A dispersant can also be added to the resin mixture. As the dispersant, commonly used products, such as BYK-164 and Foamex 810 available from Tego can be used, and the content of the dispersant may range from greater than 0 wt % to lower than about 10 wt %.

First, the boron nitride nanotube powder and glass frit mixture is combined with the polymer binder mixture and dispersed to uniformly mix the boron nitride nanotube powder and glass frit mixture with the resin mixture. An antifoaming agent can be added in an amount ranging from about 0 to about 10 wt % to the boron nitride nanotube powder, glass frit and resin mixture, and then a dispersant may be added to the mixture in an amount ranging from about 0 to about 10 wt %. The resulting mixture is stirred.

Next, an organic solvent is added to the boron nitride nanotube paste composition in an amount sufficient to provide a viscosity ranging from about 10,000 cP to about 50,000 cP. Nonlimiting examples of suitable organic solvents include terpineol, butyl carbitol acetate (BCA), toluene, and texanol. The content of the organic solvent ranges from about 20 to about 40 wt %. If the organic solvent content exceeds about 40 wt %, the viscosity of the composition becomes too low to achieve appropriate printing thickness.

According to another embodiment of the present invention, a boron nitride nanotube electron emission source is made by printing and calcining the boron nitride nanotube paste composition.

According to yet another embodiment of the present invention, an electron emission device includes a substrate, a cathode on the substrate, a gate electrode electrically insulated from the cathode, an insulation layer insulating the cathode and the gate electrode, an electron emission source hole exposing a part of the cathode, an electrode emission source in the electron emission source hole and electrically connected to the cathode, and a phosphor layer facing the electron emission source. The electron emission source includes about 100 parts by weight of boron nitride nanotubes, from about 500 to about 2000 parts by weight of glass frit, from about 1000 to about 2000 parts by weight of filler, and from about 4000 to about 6000 parts by weight of a polymer binder.

Generally, a conductor is used as an electron emission source for the electron emission device, but the boron nitride nanotubes according to embodiments of the present invention have semi-conductive properties. Because of this, there is a risk of lowering luminance, which can be compensated for by raising the gate voltage. The voltage is a pulse voltage, and therefore does not significantly affect cost.

The electron emission source according to embodiments of the present invention, unlike carbon nanotubes, has semiconductive properties. The specific resistance can range from about $10^{-3}$ Ω·cm to about $10^{-8}$ Ω·cm at about 25° C. In one embodiment, the electron emission source includes boron nitride nanotubes manufactured with the boron nitride nanotube paste composition described above.

Therefore, the electron emission source according to embodiments of the present invention has a specific resistance ranging from about $10^{-3}$ Ω·cm to about $10^{-8}$ Ω·cm at 25° C. Also, the B to N content ratio of the boron nitride nanotubes may range from about 1:0.5 to about 1:1.5. Moreover, the boron nitride nanotubes for the electron emission source can also include carbon. The carbon content may range from about 0.01 to about 100 parts by weight per 100 parts by weight of boron.

A paste method (generally used to apply a carbon nanotube electron emission source on a cathode) can be used to manufacture the boron nitride nanotube electron emission source according to embodiments of the present invention. Here, instead of the carbon nanotube paste composition, a boron nitride nanotube paste composition according to embodiments of the present invention is used. Hence, the boron nitride nanotube paste composition can be printed and calcined to form a boron nitride nanotube electron emission source on the cathode. The boron nitride nanotubes may be single-walled and/or multi-walled.

For example, the boron nitride nanotube electron emission source according to one embodiment of the present invention can be made by first printing the boron nitride nanotube paste (prepared as previously described) on the cathode to form a thick film, and drying the film at a temperature ranging from about 90 to about 110° C. for from about 10 minutes to about 1 hour.

Next, the thick film is exposed using a mask. Here, the exposure energy may range from about 100 to about 20,000 mJ/cm$^2$, and is adjustable depending on the desired thickness of the film. The exposed film is developed in a 0.4 to 5% sodium carbonate and acetone solution, or in ethanol, and the after-images are removed using an ultrasonic cleaner.

The developed film is calcined under an air and nitrogen atmosphere at a temperature ranging from about 400 to about 500° C. for from about 10 to about 30 minutes to make a boron nitride nanotube electron emission source. If the calcining temperature is lower than about 400° C., organic matter may not be removed and glass frit may not dissolve, which is not desirable.

FIGS. 1A to 1E are cross-sectional views of an electron emission device at varying steps in a method of manufacturing an electron emission device according to one embodiment of the present invention. As shown in FIG. 1A, a cathode 11 is formed on a substrate 10. For the substrate 10, a glass substrate can generally be used. Also, the cathode 11 can be a transparent conductive material such as indium tin oxide (ITO).

Specifically, the cathode layer is deposited on the substrate 10 and patterned into a shape (such as a line shape) to form the cathode 11. In one embodiment, the cathode has a line shape.

Figure 1B:
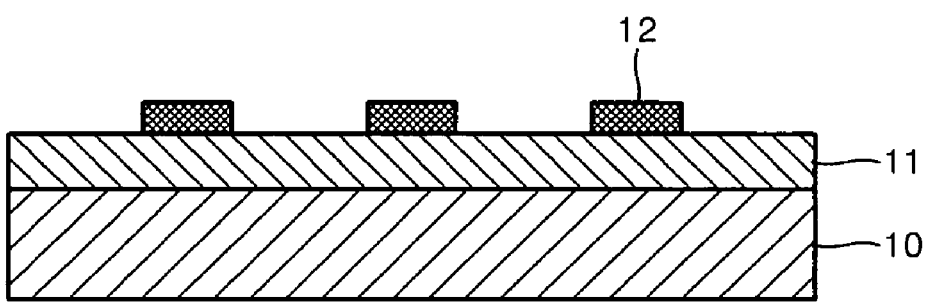

As shown in FIG. 1B, an emitter layer is formed by accumulating the emitter on the cathode 11. A boron nitride nanotube electron emission source is used as the emitter layer. Hence, the emitter layer is formed by applying the boron nitride nanotube composition in paste form on the cathode 11.

After forming the emitter layer on the cathode 11, the emitter is formed by patterning the emitter layer. The patterning can be done according to well-known techniques. For example, a mask (not shown) may be arranged in the lower part of the transparent substrate 10 and UV light irradiated toward the transparent substrate 10. The mask has a pre-shaped pattern. Therefore, when the UV light is irradiated through the mask, the emitter layer is photo-resistant according to the mask pattern. Lastly, after washing the emitter layer with acetone, for example, the emitter 12 for the electron emission device (as shown in FIG. 1B) is completed.

Figure 1C:
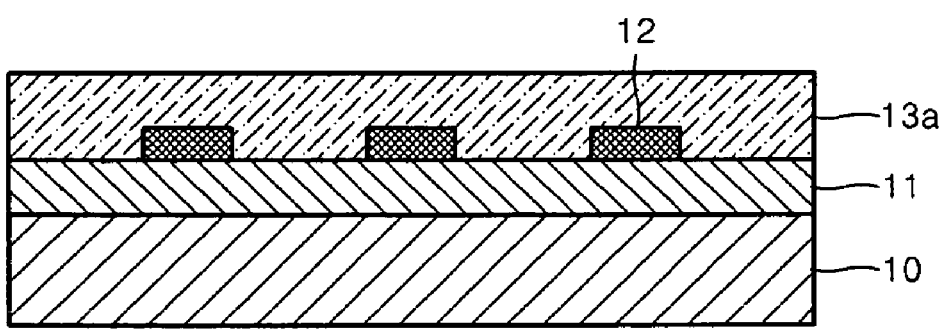

As shown in FIG. 1C, a photosensitive glass paste 13a is applied over the emitter 12 on the surface of the substrate on which the emitter 12 is formed. The rear surface of the resulting matter (which is obtained by drying the surface of the substrate) is then exposed. Accordingly, the photosensitive glass paste on the upper part of the emitter remains unexposed, and the rest of the photosensitive glass paste becomes the exposed area. Here, exposure is performed at an intensity ranging from about 200 to about 500 mJ/cm$^2$.

The photosensitive glass paste is a paste-type composition containing glass powder, photosensitive resin, and solvent. Nonlimiting examples of suitable glass powders include (1) lead oxide, boric oxide, silicon oxide, calcium oxide (PbO—$B_2O_3$—$SiO_2$—CaO group) (2) zinc oxide, boric oxide, silicon oxide (ZnO—$B_2O_3$—$SiO_2$ group) (3) lead oxide, boric oxide, silicon oxide, aluminum oxide (PbO—$B_2O_3$—$SiO_2$—$Al_2O_3$ group) (4) lead oxide, zinc oxide, boric oxide, silicon oxide (PbO—ZnO—$B_2O_3$—$SiO_2$ group), and (5) lead oxide, zinc oxide, boric oxide, silicon oxide, titanium oxide (PbO—ZnO—$B_2O_3$—$SiO_2$—$TiO_2$ group). In addition, inorganic oxide powders, such as aluminum oxides, chromium oxides, and manganese oxides, can be mixed in the glass powder.

The photosensitive resin is a material used for patterning the electron emission source, and nonlimiting examples of the photosensitive resin include pyrolytic acrylate-based monomers, benzophenone-based monomers, acetophenone-based monomers, and thioxanthone-based monomers. Specific nonlimiting examples include epoxy acrylate, polyester acrylate, 2,4-diethyloxanthone, and 2,2-dimethoxy-2-phenylacetophenone.

The content of the photosensitive material may range from about 3 to about 7 parts by weight per 100 parts by weight of glass powder. If the photosensitive resin content is below about 3 parts by weight per 100 parts by weight of glass powder, the exposure sensitivity is poor. If the photosensitive resin content exceeds 7 parts by weight, development is not performed well, which is not desirable.

For the solvent, at least one of butyl carbitol acetate (BCA), terpineol (TP), toluene, texanol, and butyl carbitol (BC) may be used. To maintain the viscosity of the paste composition within a desirable range, the solvent is present in an amount ranging from about 10 to about 20 parts by weight based on 100 parts by weight of glass powder. The solvent content can be adjusted within this range to ensure efficient printing performance.

The photosensitive glass paste can also include one or more additives selected from photoinitiators, viscosity enhancers, resolution enhancers, dispersants, and antifoaming agents. The photoinitiator initiates cross-linking of the photosensitive resin when the photosensitive resin is exposed. A nonlimiting example of a photoinitiator includes benzophenone.

Figure 1D:
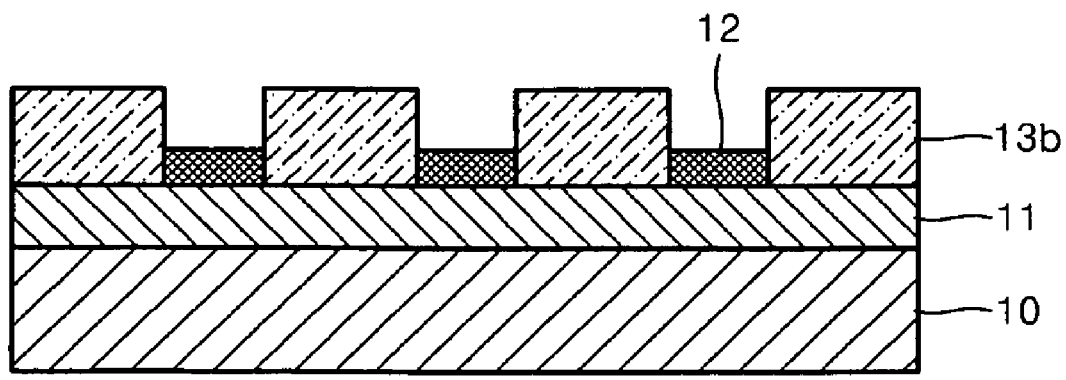

After exposing the device depicted in FIG. 1C, the resultant product is developed, and the unexposed area in the upper part of the emitter layer is removed. The top part of the resulting product is calcined and hardened at a temperature ranging from about 450 to about 500° C., thereby forming a gate insulation layer 13b as shown in FIG. 1D.

Figure 1E:
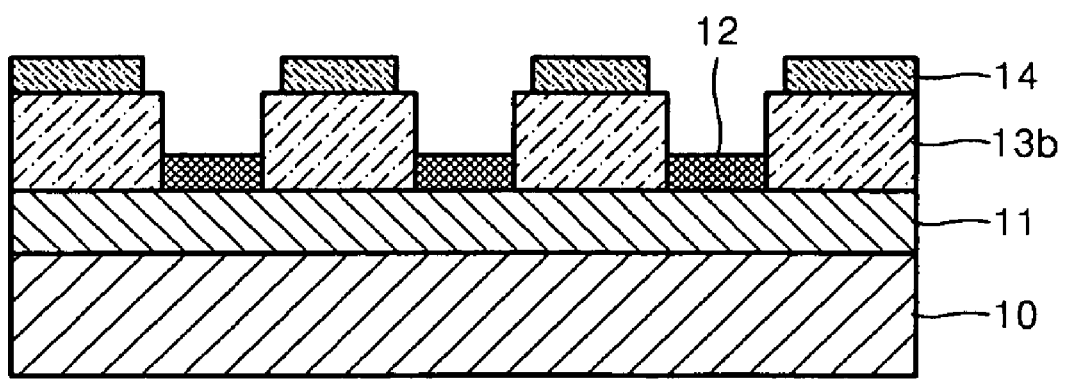

By including an extra gate electrode on the top surface of the gate insulation layer, the electron emission device according to embodiments of the present invention can have a three-electrode structure. As shown in FIG. 1E, the gate electrode 14 is formed on the gate insulation layer 13b. The gate electrode 14 can have a gate hole corresponding to the perforated hole on the top part of the emitter, and can be formed by a thin-film process of deposition and patterning of metallic materials, or a thick-film process of screen printing of a metal paste.

The electron emission devices according to embodiments of the present invention can be used in various electronic devices, such as backlight devices for liquid crystal displays (LCDs), and electron emission display devices.

According to one embodiment of the present invention, an electron emission-based backlight device includes an electron emission device according to an embodiment of the present invention. The backlight device includes a top substrate and a bottom substrate positioned in parallel and separated by a distance, an anode formed on the top substrate, a phosphor layer having a thickness formed on the anode, and an electron emission device according to an embodiment of the present invention between the top substrate and the bottom substrate.

The backlight device is operated by first applying a voltage to the gate electrode, and then applying a voltage to the anode, thereby causing electron emission from the electron emission source. The emitted electrons emitted proceed toward the anode and collide with the phosphor layer. Then, visible light is emitted from the phosphor layer and passes through the top substrate and/or the bottom substrate.

Figure 2:
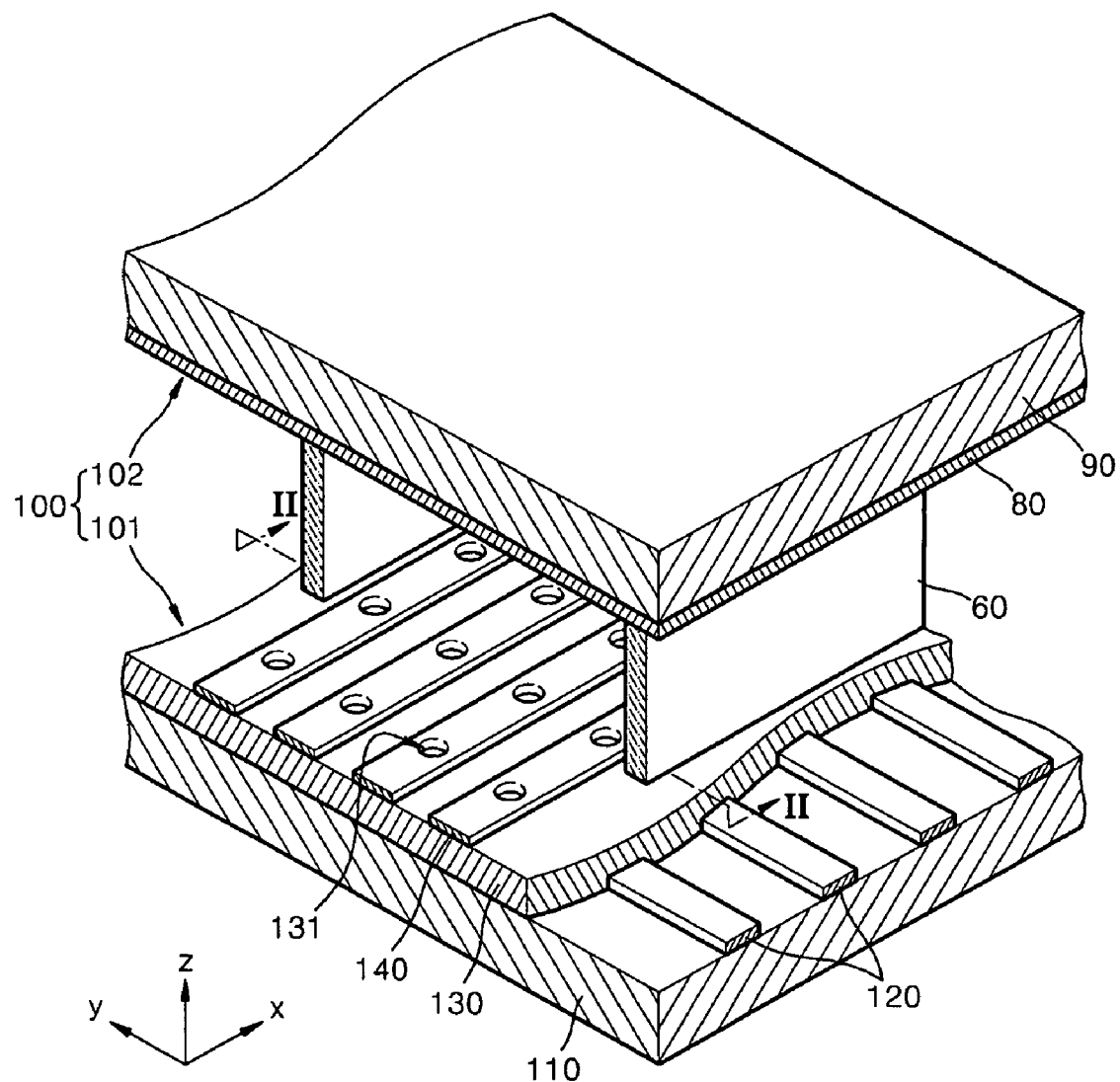
FIG. 2 is a perspective view of an electron emission device according to an embodiment of the present invention.

According to one embodiment of the present invention, an electron emission display device includes the above described electron emission device. FIG. 2 illustrates a top gate electron emission display device, and FIG. 3 is a cross-sectional view of the electron emission display device of FIG. 2 taken along line II-II.

Figure 3:
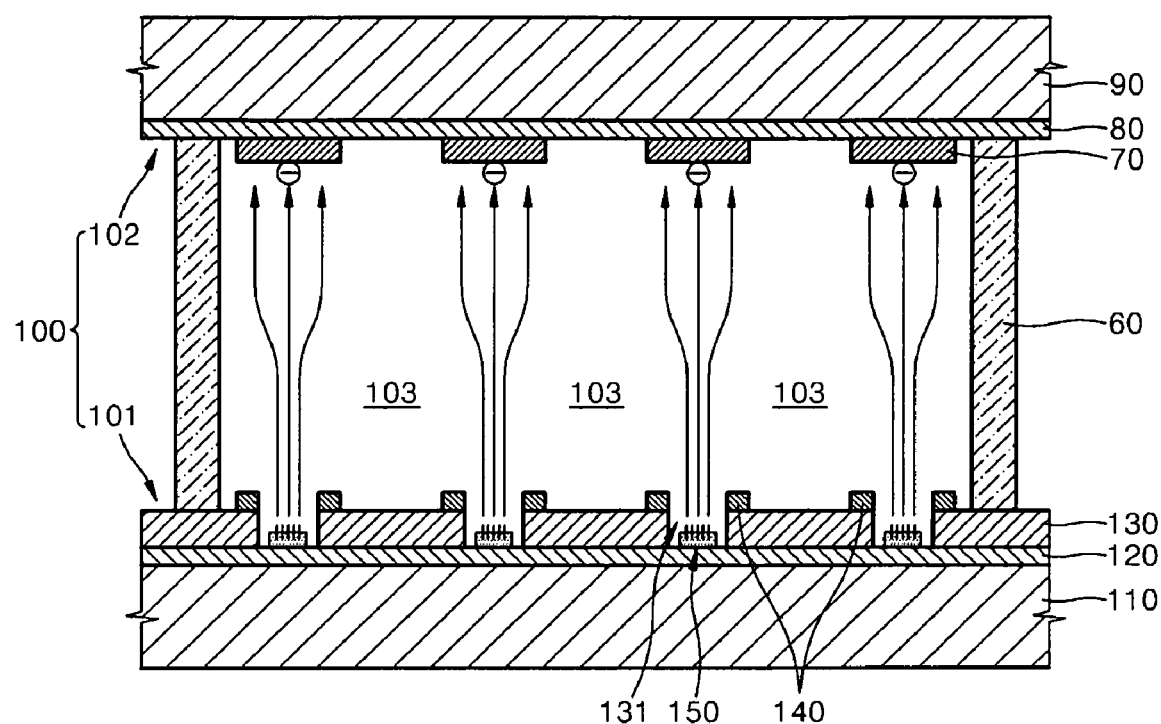
FIG. 3 is a cross-sectional view of the electron emission device of FIG. 2 taken along line II-II.

As shown in FIGS. 2 and 3, the electron emission display device 100 includes an electron emission device 101 according to an embodiment of the present invention and a front panel 102 aligned in parallel with the electron emission device, which form a vacuum luminescent space 103. A spacer 60 is also provided for keeping a space between the electron emission device 101 and the front panel 102.

The electron emission device 101 includes a first substrate 110, gate electrodes 140 and cathodes 120 on the first substrate 110, and an insulation layer 130 between the gate electrodes 140 and the cathodes 120 to electrically insulate the gate electrodes 140 and the cathodes 120. The electron emission source holes 131 are formed in areas where gate electrodes 140 and cathodes 120 intersect, and electron emission sources 150 are disposed in the holes 131.

The front panel 102 includes a second substrate 90, an anode 80 on the second substrate 90, and a phosphor layer 70 on the anode 80.

The electron emission display device is not limited to the embodiments depicted in and described with reference to FIGS. 2 and 3, but may be modified in various ways such as including a second insulation layer and/or additional focusing electrodes.

The following examples are presented for illustrative purposes only, and do not limit the scope of the invention.

EXAMPLE 2 g of boron nitride powder, 50 g of a polymer binder, 15 g of $In_2O_3$ powder, 10 g of glass frit, and 3 g of BYK111 (a dispersant) were added to 20 g of terpineol and stirred to form an electron emission source forming paste composition.

An ITO cathode was patterned in lines on the glass substrate. The electron emission source forming paste composition was applied on the cathode and irradiated using a parallel exposing unit at an exposure energy of 1000 $mJ/cm^2$. Then, the substrate was developed with acetone, and the electron emission source forming composition was formed on the electron emission source forming area.

A photoresist glass paste composition was applied on the resulting material, and dried to form a photoresist glass paste layer, which was irradiated from the back side of the substrate using a parallel exposing unit at an energy of 300 $mJ/cm^2$. Then, the irradiated surface was developed using sodium carbonate salt as an alkaline developing solution, and heat-treated at a temperature of 500° C. in an air gas atmosphere to form a gate insulation layer. The gate electrode was formed on the gate insulation layer (a material for the gate electrodes may be Cr, for example) to prepare an electron emission device.

While the present invention has been illustrated and described with reference to certain exemplary embodiments, it is understood by those of ordinary skill in the art that various modifications and changes to the described embodiments may be made without departing from the spirit and scope of the present invention as defined by the following claims.

What is claimed is:

1. A boron nitride nanotube paste composition comprising:
   about 100 parts by weight boron nitride nanotubes;
   from about 500 to about 2000 parts by weight glass frit;
   from about 1000 to about 2000 parts by weight filler;
   from about 2000 to about 4000 parts by weight organic solvent; and from about 4000 to about 6000 parts by weight polymer binder.

2. The boron nitride nanotube paste composition of claim 1, wherein a ratio of B to N of the boron nitride nanotubes ranges from about 1:0.5 to about 1:1.5.

3. The boron nitride nanotube paste composition of claim 2, wherein the boron nitride nanotubes further comprise carbon.

4. The boron nitride nanotube paste composition of claim 3, wherein a carbon content in the boron nitride nanotubes ranges from about 0.01 to about 100 parts by weight per 100 parts by weight boron.

5. The boron nitride nanotube paste composition of claim 1, wherein the filler is selected from the group consisting of Ag, $Al_2O_3$, $In_2O_3$ and $SnO_2$.

6. The boron nitride nanotube paste composition of claim 1, wherein the organic solvent is selected from the group consisting of terpineol, butyl carbitol acetate, and texanol.

7. The boron nitride nanotube paste composition of claim 1, wherein the binder polymer is selected from the group consisting of methyl methacrylate-methyl acrylic acid (MMA-MAA) and methyl methacrylate-acrylic acid-polystyrene (MMA-AA-PS).

8. The boron nitride nanotube paste composition of claim 1, further comprising an additive selected from the group consisting of viscosity enhancers, leveling enhancers, dispersants, antifoaming agents, and combinations thereof.

9. A boron nitride nanotube electron emission source comprising a printed and calcined boron nanotube paste composition of claim 1.

10. An electron emission device comprising:
a substrate;
at least one cathode on the substrate;
at least one gate electrode electrically insulated from the cathode;
an insulator layer insulating the cathode and the gate electrode;
an electron emission source hole exposing a part of the cathode;
an electron emission source in the electron emission hole and electrically connected to the cathode, the electron emission source comprising about 100 parts by weight boron nitride nanotubes, from about 500 to about 2000 parts by weight glass frit, from about 1000 to about 2000 parts by weight filler, and from about 4000 to about 6000 parts by weight polymer binder; and
a phosphor layer opposing the electron emission source.

11. The electron emission device of claim 10, wherein a specific resistance of the device ranges from about $10^{-3}$ Ω·cm to about $10^{-8}$ Ω·cm at 25° C.

12. The electron emission device of claim 10, wherein a ratio of B to N in the boron nitride nanotubes ranges from about 1:0.5 to about 1:1.5.

13. The electron emission device of claim 12, wherein the boron nitride nanotubes further comprise carbon.

14. The electron emission device of claim 13, wherein a carbon content in the boron nitride nanotubes ranges from about 0.01 to about 100 parts by weight per 100 parts by weight boron.

15. The electron emission device of claim 10, wherein the cathode is patterned in a line pattern in parallel with the substrate.

16. The electron emission device of claim 10, further comprising a gate electrode on the gate insulation layer.

17. An electron emission based backlight device comprising the electron emission device of claim 10.

18. An electron emission display device comprising the electron emission device of claim 10.

* * * * *